Dec. 9, 1941.  B. F. WADDELL  2,265,210
METHOD AND APPARATUS FOR REGULATING PRESSURE
Filed Jan. 19, 1939  2 Sheets-Sheet 1
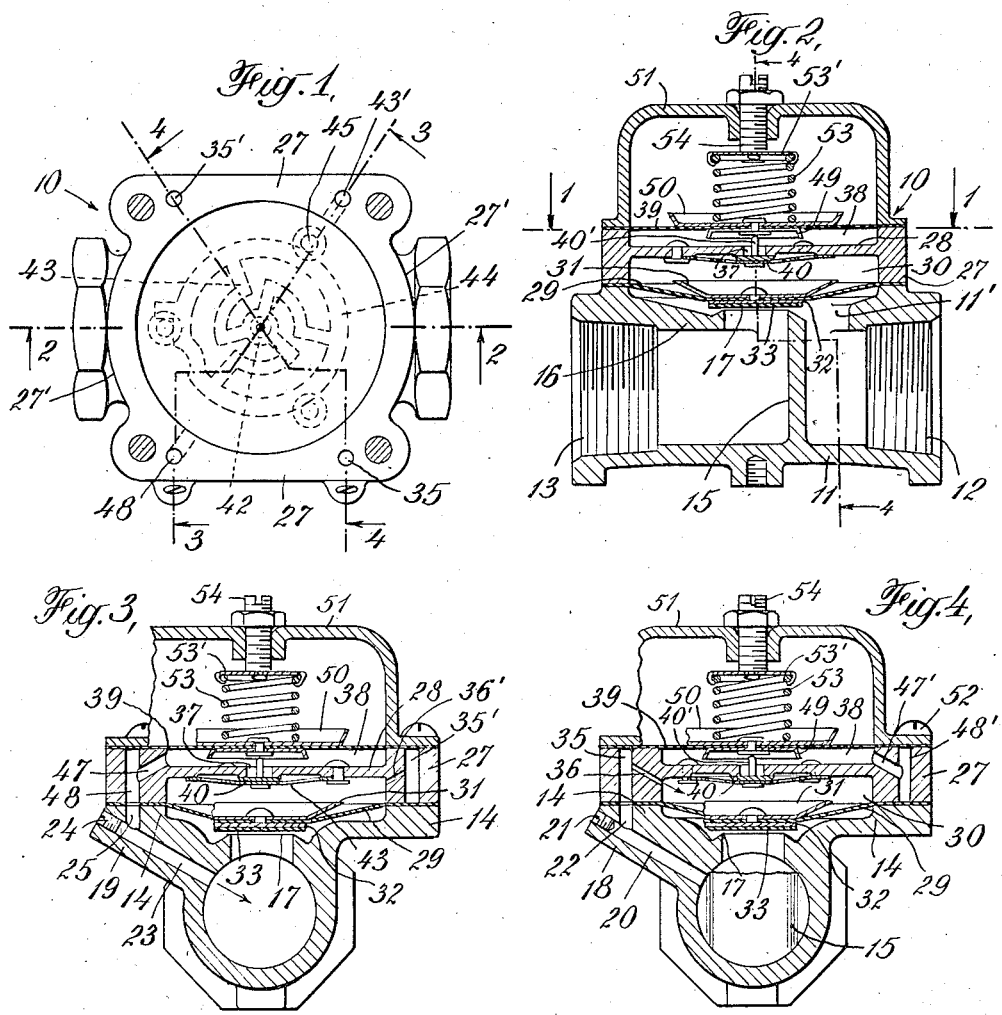
INVENTOR
Benson F. Waddell
BY
Pennie Davis Marvin & Edmonds
ATTORNEYS

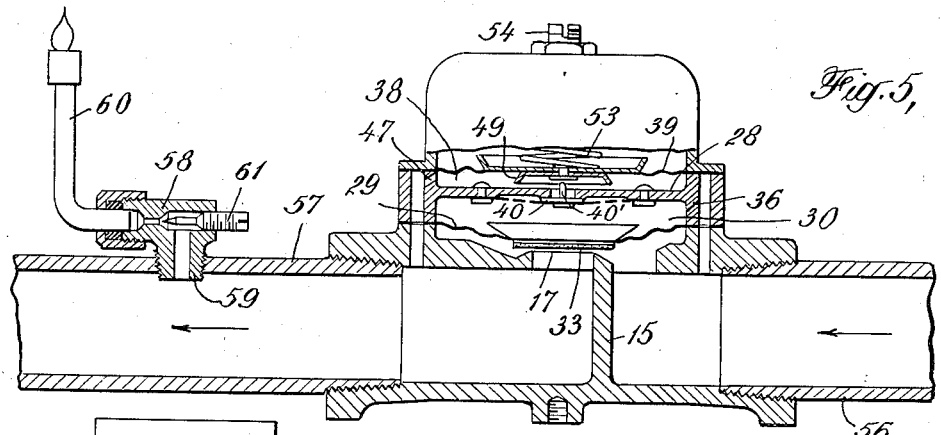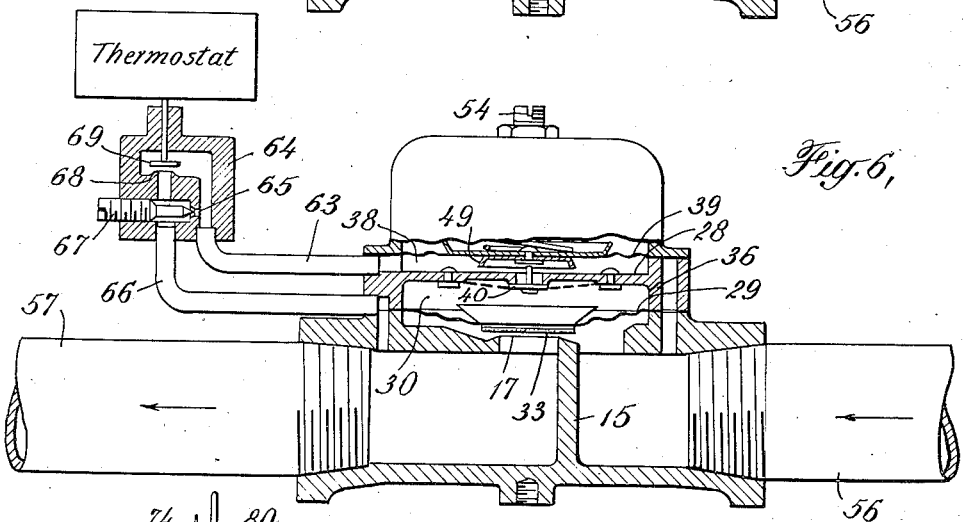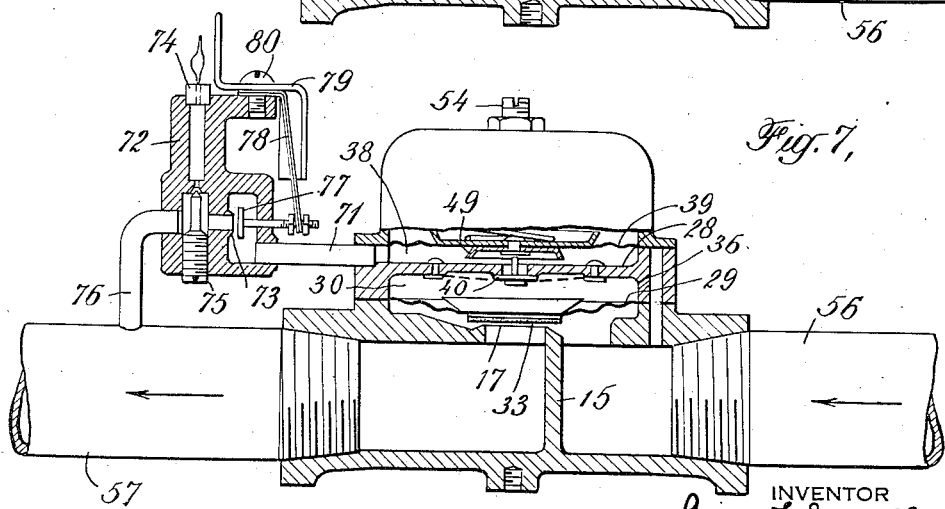

Patented Dec. 9, 1941

2,265,210

UNITED STATES PATENT OFFICE 2,265,210

METHOD AND APPARATUS FOR REGULATING PRESSURE

Benson F. Waddell, Newark, N. J., assignor to The Wilcolator Company, Newark, N. J., a corporation of Delaware Application January 19, 1939, Serial No. 251,716

4 Claims. (Cl. 158—117.1)

This invention relates to the regulation of pressures and has particular reference to a novel method of regulating the pressure and flow of gas to a burner in accordance with the pressure in a separate, relatively minute stream of the gas which may supply a pilot for the burner. The new method is simple, reliable and economical and may be performed efficiently by a novel pressure regulator which forms part of the invention.

In the operation of gas burners having a pilot, the gas is commonly supplied to the burner and the pilot from a gas main through an automatic pressure regulator. The regulator is necessarily quite large since its control valve must be capable of passing enough gas to operate both the pilot and the burner when the latter is turned on to full capacity. With a regulator of this size, it is difficult to provide a sufficiently sensitive control of the valve to operate the small pilot alone without excessive or insufficient pressure. Accordingly, the pilot frequently burns too much gas and results in waste or, if the pressure becomes too low, is extinguished. Another method employed heretofore is to supply gas to the pilot through a needle valve independently of the burner control valve. Generally, the needle valve may be manipulated to obtain the required flow for efficient operation of the pilot. However, a sudden decrease in the pressure at the supply main or a sudden increase in the demand of the burner may cut down the flow through the needle valve sufficiently to extinguish the pilot and thereby create a dangerous condition.

One feature of the present invention, therefore, resides in the provision of a novel method and apparatus for supplying gas to a heater, including a burner and a pilot, whereby the pressure at the pilot remains substantially constant at all times regardless of the operation of the burner or variations in the pressure at the supply main.

According to the new method, gas is bled from the supply main in a minute stream through a zone of intermediate pressure to a low pressure zone which communicates with both the burner and the pilot. The flow between the zones of intermediate and low pressure is valved in accordance with pressure changes in the low pressure zone, so as to maintain a substantially constant pressure in the low pressure zone. The burner, however, is operated with gas supplied from the main in a relatively large stream separate from the first stream, and the flow in the larger stream is controlled in accordance with the differential between the pressure in the supply main and that in the intermediate pressure zone of the small stream. The flow in the larger stream may be controlled by a diaphragm-operated valve, the diaphragm being subjected on one side to the high pressure in the main and on the other side to the pressure in the intermediate zone. Also, the valving of the small stream between the intermediate and low pressure zones may be conveniently effected with a small auxiliary valve controlled by a diaphragm subjected on one side to the pressure in the low pressure zone and on the opposite side to a constant pressure.

With this method, the supply of gas to both the burner and the pilot is controlled by the pressure in the low pressure zone of the small stream, so that regardless of pressure variations in the supply main or changes in the demand of the burner, the low pressure zone and the outlet gas are maintained at constant pressure. More particularly, when the pressure in the supply main decreases, the tendency for the pressure in the low pressure zone to decrease with it immediately causes the auxiliary valve for the small stream to open wider and permit more gas to flow from the intermediate zone into the low pressure zone, whereby the pressure in the latter is restored. Conversely, if the pressure in the main should increase, the tendency for the pressure in the low pressure zone to increase with it causes the auxiliary valve immediately to shut down the flow of gas from the intermediate zone, whereby the pressure in the low pressure zone decreases to the desired amount.

When the demand of the burner increases, the pressure in the low pressure zone communicating with the burner tends to decrease and immediately causes the auxiliary valve to open wider and increase the flow from the intermediate pressure zone. As a result, the pressure in the intermediate zone decreases and permits the large valve to open wider under the action of the pressure in the gas main, so as to meet the increased demand of the burner. On the other hand, if the demand of the burner should decrease the gas supplied to it builds up a pressure which is communicated to the low pressure zone of the small stream and causes the auxiliary valve to reduce the flow of gas from the intermediate zone to the low pressure zone. This, in turn, causes the pressure in the intermediate zone to build up and close down the large valve against the pressure in the main, so that the flow through the large valve is now adjusted in accordance with the new demand of the burner. If desired, the supply of gas to the main burner may be controlled thermostatically in accordance with the invention by thermostatically valving the flow of gas in the small stream between the low pressure zone and the heater.

A pressure regulator made in accordance with the invention comprises a housing having inlet and outlet openings and a valve seat between the openings. Above the seat and coacting therewith is a valve member mounted on a diaphragm which is likewise positioned above the seat. The diaphragm is subjected on its lower face to the inlet pressure and on its upper face to the pressure in an intermediate-pressure chamber, the latter being supplied with gas through a bleed passage leading from the inlet side of the valve seat. Above the intermediate-pressure chamber and separated therefrom by a partition is a low pressure chamber supplied with gas from the intermediate chamber through a small duct in the partition. The passage of gas between these two chambers is regulated by a small auxiliary valve controlled by an auxiliary diaphragm forming one wall of the low pressure chamber. Preferably, the auxiliary valve is formed with a head in the intermediate chamber and has a stem extending loosely through the duct, the auxiliary diaphragm being movable relative to the stem and adapted to engage the same and open the auxiliary valve. The stem may be held in the duct by a spring secured to the partition in the intermediate chamber and engaging the head of the valve so as to urge the head against the partition and close the duct. Suitable means are provided for connecting the low pressure chamber to the outlet side of the main valve.

The new regulator operates to maintain at all times a substantially constant pressure in the outlet side of the main valve and in the low pressure chamber. If the outlet pressure becomes too low, the resulting decrease in pressure in the low pressure chamber causes the auxiliary diaphragm to move into contact with the stem of the auxiliary valve and open the latter against the action of the spring acting on it. The gas in the intermediate chamber may then pass at a greater rate to the low pressure chamber, whereby the pressure in the intermediate chamber is reduced and permits the inlet pressure acting on the bottom of the main diaphragm to move the main valve away from its seat. If the outlet pressure should become too great, it acts through the low pressure chamber to move the auxiliary diaphragm away from the auxiliary valve. The spring then shuts down the auxiliary valve so as to decrease the flow from the intermediate chamber to the low pressure chamber. As a result, the pressure in the intermediate chamber builds up and acts on the top of the main diaphragm to force the main valve toward its seat. It will be apparent that the main valve more or less floats with its diaphragm, since the total inlet pressure acting on the bottom of the diaphragm substantially balances the weight of the valve and the total intermediate pressure acting on the top of the diaphragm. Accordingly, there is practically no stress exerted on the diaphragm.

The low pressure chamber may be connected directly to the outlet side of the main valve through a bleed passage formed in a side wall of the housing, or it may be connected to the outlet side through a thermostatic valve responsive to the temperature of a pilot, an oven, or the like. In either case, when the regulator is used for operating a main burner and its pilot, the small stream of gas passing through the low pressure chamber to the outlet connection is controlled by the auxiliary valve so as to provide just enough gas to operate the pilot, regardless of changes in operating conditions, and the movements of the auxiliary valve incident to changes in operating conditions results automatically in adjustment of the main valve to compensate for these changes.

For a better understanding of the invention reference may be had to the accompanying drawings, in which:

Fig. 1 is a plan view of one form of the new regulator with the cover and the auxiliary diaphragm removed;

Fig. 2 is a longitudinal section on the line 2—2 in Fig. 1;

Fig. 3 is a section on the line 3—3 in Fig. 1;

Fig. 4 is a section on the line 4—4 in Fig. 1, the lower part of the section, however, being in the plane of the lower part of the line 4—4 in Fig. 1, as indicated in Fig. 2;

Fig. 5 is a longitudinal section showing one application of the new regulator, the regulator being illustrated somewhat diagrammatically;

Fig. 6 is a view similar to Fig. 5 showing a modified form of the regulator in which the flow of gas from the low pressure chamber to the outlet side is controlled thermostatically, and Fig. 7 is a view similar to Figs. 5 and 6 showing another modification of the regulator in which the flow of gas from the low pressure chamber to the outlet side is controlled by the temperature of a pilot.

In the drawings, the numeral 10 designates a housing comprising a hollow section 11 of generally cylindrical form and provided at its ends with hollow bosses forming inlet and outlet openings 12 and 13, respectively. At the top, the section 11 is provided with an opening 11' partly surrounded by horizontal flanges 14 extending from opposite sides of the section. A semi-circular partition 15 extending upwardly from the bottom of the section separates the inlet and outlet openings and at the top is integral with a horizontal partition 16 offset below the top of the section, the partitions 15 and 16 together forming a circular valve seat 17 disposed slightly below the top of the section 11.

One of the flanges 14 is connected to the cylindrical body of the section 11 by a pair of heavy fillets 18 and 19. The fillet 18 is drilled to form a bore 20 leading obliquely upwardly from the inlet side of the partition 15, the outer end of the bore being closed by a plug 21. A vertical bore 22 is drilled in the flange 14 and connects with the oblique bore 20 near the plug. Similarly, a bore 23 in the fillet 19 leads to the outlet side of the partition 15 and is closed at its outer end by a plug 24, and a vertical bore 25 in the flange connects with the bore 23.

Mounted on the main section 11 is a relatively thin intermediate section 27 provided with a horizontal partition 28, the section being formed with recesses above and below the partition. The side edges of the intermediate section are straight and coincide with the edges of the flanges 14, as shown in Figs. 1 and 3, while the ends 27' are rounded where they overlie the hollow bosses of the section 11. A diaphragm 29 is clamped along its edges between the two sections and forms a chamber 30 below the partition 28. A dish-shaped member 31 is centrally disposed on the upper face of the diaphragm, and on the lower face directly over the valve seat 19 is a metal disc 32, the disc and the member 31 being secured to the diaphragm by a stud on the disc extending up through the diaphragm and the dish-shaped member and upset at its end against the latter. A thin rubber-like disc 33 is cemented or otherwise secured to the metal disc 32 and forms a valve member coacting with the seat 17.

The section 27 is formed near one corner with a vertical bore 35 aligned with the bore 22 in section 11, and the bore 35 communicates with the chamber 30 through a small bleed passage 36. A similar bore 35' is formed near the opposite corner of the section 27, the latter bore being so positioned that it overlies the bore 22 when the position of the section 27 is reversed on the lower section. The bore 35' likewise communicates with chamber 30 through a small bleed passage 36'.

The partition 28 is provided with a small opening or duct 37 through which fluid may pass from the chamber 30 into a chamber 38 between the top of the partition and a diaphragm 39. The passage of fluid between the two chambers is controlled by an auxiliary valve 40 adapted to seat against an offset portion on the bottom of the partition 28 and formed with a stem 40' which extends loosely through the duct 37. The valve member 40 is normally held against its seat by means of a leaf spring including a hub 42 through which a projection on the valve member extends, the spring also including arms 43 extending radially outwardly in zigzag fashion to a rim 44 which is secured to the lower face of the partition by rivets 45. A passage 47 leads outwardly from chamber 38 to a vertical bore 48 aligned with an opening in the lower diaphragm and the bore 25. A vertical bore 48' similar to bore 48 is formed in section 27 near the opposite corner and is connected to the chamber 38 through a passage 47'. The bore 48' is adapted to align with the bore 25 when the position of the section 27 is reversed on the lower section.

The stem 40' of the auxiliary valve projects above the top of partition 28 and is adapted to be engaged by a rivet which secures an inverted dish-shaped member 49 on the lower face of diaphragm 39, the rivet extending up through the diaphragm and through another dish-shaped member 50 secured on the upper face of the diaphragm. The diaphragm 39, which may be made of thin aluminum or other metal, is clamped to the intermediate section 27 along its edges by an upper section 51, the three housing sections being secured together by screws 52 extending loosely through the sections 51 and 27 and threaded into the main section. A coil spring 53 is engaged at its lower end with the dish-shaped member 50 and is held at its upper end in an inverted dish-shaped member 53' which is suspended on the lower end of an adjustment screw 54 threaded through the top of the housing.

While the new regulator may be used for various purposes, I have illustrated in Fig. 5 one use of the regulator in which it controls the flow of gas to a pilot and a burner. As there shown, a pipe 56 leading from a gas supply main is threaded into the inlet opening 12 of the housing, and a pipe 57 threaded into the outlet opening 13 leads to a burner (not shown). Between the burner and the housing is a fitting 58 having a nipple 59 threaded into the pipe 57. The fitting is adapted to supply gas to a pilot tube 60 located sufficiently close to the burner to ignite the gas flowing through it. The flow of gas to the pilot tube may be regulated manually by means of a needle valve 61 threaded into the fitting 58.

By manipulating the screw 54, the pressure exerted by spring 53 against the diaphragm 39 is adjusted so that the latter engages the stem 40' and normally holds the auxiliary valve 40 in a throttling position to pass just enough gas to operate the pilot 60. The pilot is then continuously supplied with gas from the main 56 through inlet opening 12, passages 20, 22, 35 and 36, chamber 30, duct 37, chamber 38, passages 47, 48, 25 and 23, outlet opening 13 and pipe 57. This stream of gas is relatively minute because of the small size of the bleed passage 36 and the slight displacement of auxiliary valve from its seat but is sufficient to operate the pilot safely when the main valve 33 is closed. The diaphragm 39 controls the auxiliary valve so as to maintain a substantially constant low pressure in chamber 38 for operating the pilot, regardless of changes in operating conditions. That is, if the pressure in the chamber 38 tends to decrease for any reason, the diaphragm 39 moves the auxiliary valve further from its seat and allows more gas to pass into the low pressure chamber 38 from the intermediate chamber 30. Conversely, if the pressure in chamber 38 becomes too great, the diaphragm 39 is moved upwardly and permits spring 41 to move the auxiliary valve toward its seat and cut down the flow of gas to the low pressure chamber from the intermediate chamber 30.

The auxiliary valve 40 not only maintains the required minimum flow for the pilot but also controls the main valve 33. That is, when the burner is turned off, the auxiliary valve is normally held by diaphragm 39 in its throttling position in which it passes just enough gas to the chamber 38 to operate the pilot. In this position of the auxiliary valve, the pressure in the intermediate chamber 30 is relatively high, since the rate of flow from the intermediate chamber through the duct 37 is momentarily relatively low as compared with the rate of flow from the inlet through the bleed passage 36 so that the pressure in the intermediate chamber may build up to nearly equal the inlet pressure. Consequently, the total pressure exerted by the fluid in chamber 30 on the diaphragm 29, together with the weight of the parts mounted on the diaphragm, is sufficient to seat the valve 33 against the total inlet pressure exerted on the bottom of diaphragm 29. However, when the burner is turned on, there is a tendency to decrease the pressure in pipe 57 and low pressure chamber 38, whereby the diaphragm 39 moves downwardly and forces the auxiliary valve further from its seat so that a greater amount of gas may pass from the intermediate chamber 30 to the chamber 38. This increased flow not only tends to counteract directly the drop in pressure in the pipe 57 but also decreases the pressure in intermediate chamber 30 relative to the inlet pressure in pipe 56, and as a result the latter pressure acting on the bottom of diaphragm 29 is sufficient to raise valve 33 against the decreased pressure in chamber 30. Gas then passes through the seat 17 and outlet opening 13 so as to supply the burner and maintain the required gas pressure in pipe 57. During the operation of the burner, any change in the demand of gas consumed by it is reflected in a change in pressure in the pipe 57 and the low pressure chamber 38, and this pressure change moves the diaphragm 39 and auxiliary valve 40 so as to change the pressure in intermediate chamber 30 and thereby readjust the position of the main valve to meet the new demand.

Because of the small size of auxiliary valve 40, it is possible to maintain a delicate pressure control of an extremely small flow just sufficient to operate the pilot. The spring 41 in conjunction with the diaphragm 39 provides a delicate balance for the auxiliary valve which results in an extremely sensitive operation, whereby the auxiliary valve responds quickly to slight changes in pressure in the chamber 38. Since the difference in pressure in chamber 38 and section 51 is relatively small and the auxiliary valve 40 with its delicate spring loading exercises only a slight pressure on the diaphragm, the latter is not subjected to any substantial stress. Also, the main diaphragm 29 is stressed only slightly, because the total inlet pressure acting on the bottom of the diaphragm is substantially balanced by the weight of the parts on the diaphragm and the total pressure in the intermediate chamber acting on the top of the diaphragm. Accordingly, the diaphragms may be used for long periods of time without replacement. By making the diaphragm 39 of thin metal, such as aluminum, any tendency for the diaphragm and the auxiliary valve to flutter is reduced.

The regulator may be readily disassembled by removing the screws 52 and is easy to assemble because the spring 53 and the member 53' are secured to section 51 by the adjustment screw, and the valve 40 and leaf spring 42 are secured to the intermediate section at all times. In assembling the regulator, the intermediate section 27 may be mounted on the lower section in any position so long as the straight sides of the intermediate section coincide with the straight sides of flanges 14. This is so because of the bores 35' and 38' and their connecting passages formed in the side of the intermediate section opposite the bores 35 and 38. The new regulator may be made of extremely small size for a given capacity, since the small auxiliary valve 40 permits the use of a correspondingly small diaphragm to actuate it.

By making the top section 51 relatively large, it is unnecessary to provide a vent between the interior of the section and the outside of the housing, because the pressure of a large volume of air trapped in the section 51 does not change substantially with the slight movements of diaphragm 39. By thus eliminating the usual air vent, it is impossible for gas to escape from the inlet 12 through the housing in the event that either or both of the diaphragms should rupture. Accordingly, it is unnecessary to connect the atmospheric chamber at the top of the housing to a flue as is common in devices of this type.

If desired, the flow of gas through the main valve 33 may be controlled thermostatically by a slight modification of the regulator, shown in Fig. 6. As there shown, the outlet passage 48 in the intermediate section is eliminated and the low pressure chamber 38 is connected by a small pipe 63 to a casing 64, where the stream of gas flowing from chamber 38 divides. One branch of the stream passes through a small opening 65 to a pipe 66 communicating with the pipe 57, the flow of gas through the opening 65 being adjustable manually by a needle valve 67 threaded into the casing. The other branch of the stream flows through a valve seat 68 to the pipe 66, and the passage of gas through the seat 68 is controlled by a thermostatic valve 69 responsive to the temperature in an oven, or the like.

With this construction, a continuous stream of gas is supplied from the low pressure chamber 38 through pipe 63, opening 65 and pipes 66 and 57 so as to maintain a safe minimum flame at the burner. A slight additional amount may also be supplied through the seat 68 depending on the position of thermostatic valve 69. The operation of the regulator is similar to that of the regulator shown in Fig. 5, except that when the valve 69 moves toward its seat, the flow through pipe 63 is decreased, whereby the pressure in chamber 38 builds up. This causes the diaphragm 39 to move upwardly and allow valve 40 to cut down the flow of gas from the intermediate chamber 30 to chamber 38. As a result, the pressure in chamber 30 builds up and moves the main valve 33 toward its seat so as to cut down the supply of gas to the burner. However, when the thermostat moves valve 69 away from its seat, the gas flows through pipe 63 at a greater rate and causes a decrease in pressure in chamber 38. The diaphragm 39 then moves valve 40 away from its seat and allows gas to flow through duct 37 at a greater rate, whereby the pressure in chamber 30 decreases and allows the main valve to move away from its seat.

In the modification shown in Fig. 7, the outlet from the low pressure chamber 38 is in the form of a pipe 71 leading to a casing 72, where the gas from chamber 38 passes through a valve seat 73 to a pilot 74. The rate of flow of gas to the pilot may be controlled by a needle valve 75 threaded into the casing. The interior of the casing communicates through a pipe 76 to the pipe 57 which leads to a burner (not shown) adapted to be lighted by the pilot. The passage of gas through valve seat 73 is controlled by a valve member 77 operated by a bimetallic thermostat 78. A metal bracket 79 engages one end of the thermostat 78 and has a portion disposed near the flame of the pilot, the bracket 79 and thermostat 78 being secured to the casing by a screw 80.

When the pilot 74 is burning, the heat from the flame is conducted through the bracket 79 to thermostat 78 and causes the latter to assume the position shown in Fig. 7, wherein the valve 77 is held away from its seat. Gas may then flow from low pressure chamber 38 through pipe 71 and valve seat 73 to the pilot. The operation of the regulator is similar to that of the regulator shown in Fig. 5, except that if the pilot 74 is accidentally extinguished, the thermostat 78 cools and moves valve 77 against its seat. This cuts off the supply of gas to the pilot and causes the pressure in chamber 38 to build up until the diaphragm 39 allows the auxiliary valve to close. As a result, the pressure builds up in intermediate chamber 30 and acts on diaphragm 29 to seat the main valve 33. Thus, the regulator controls both the pilot and the burner and acts positively to cut off the flow of gas to these parts when the pilot flame is extinguished. When the pilot is extinguished and the valve 77 closed, the pilot may be ignited by holding a match near the thermostat 78 until the latter opens the valve 77 and then applying the match to the pilot.

It will be observed that with the construction shown in Fig. 6, the gas passing through pipe 63 to the valve 69 is maintained at a constant pressure regardless of pressure variations of the gas in the inlet pipe 56. Accordingly, the thermostat may be accurately calibrated to respond to temperature changes and throttle the flow of gas in the main stream in accordance with the demands of the thermostat. Likewise, in the construction shown in Fig. 7, the gas passing through pipe 71 is maintained at a constant pressure, and as long as the valve 77 remains open, the pressure at both the main burner and the pilot remains constant. In other words, the constructions shown in Figs. 6 and 7 are combination pressure and temperature regulators.

The new regulator may be made in a small and compact form as compared with those of prior constructions. The regulators now on the market for use on domestic appliances are at least 4 inches in diameter, because the conventional regulator requires a long stroke for the valve which, in turn, requires the use of a large flexible diaphragm and a long spring to control the diaphragm through the long stroke of the valve. The regulator of the invention is made relatively small by providing two diaphragms, one operating as a pressure regulator for a very small quantity of gas which controls the other diaphragm, the latter serving to amplify the movements of the pressure regulator so as to operate a large gas valve. Thus, the diaphragm associated with the small pressure regulator operates with a short stroke so that it may be made of a small diameter and relatively stiff, and the spring controlling the diaphragm may be relatively short, as it flexes very little in operation. The other diaphragm does not require a spring and is subjected to almost equal gas pressures on both sides, so that it may be made of very flexible material to provide the longer stroke required. This flexible material would be unsuitable in a conventional pressure regulator where the diaphragm is subjected to the outlet gas pressure on one side and atmosphere on the other with consequent danger of rupture, but is entirely satisfactory in the new regulator where it floats under negligible strain between almost equal gas pressures on opposite sides.

Proper regulation of the flow of gas in both very small and large volumes has been difficult to obtain heretofore in a single valve. The conventional pressure regulator is a compromise between these two extremes, but a gas range or a water heater requires close regulation for a constantly burning pilot using less than half a cubic foot of gas an hour and for intermittently operating burners using as much as 200 cu. ft. an hour. In the new regulator, these requirements are met by providing two valves, one large and one small, the small valve supplying the pilot and the large valve handling the requirements of the burners. The area of the regulating valve 40 is so small in comparison to the area of the diaphragm actuating it that its reaction on the diaphragm is substantially negligible. In the conventional pressure regulator, on the other hand, the large valve is subjected to the widely varying inlet pressure on one side and to a constant outlet pressure on the other side and exerts a varying reaction on the diaphragm.

One of the principal objections to prior pressure regulators for demestic appliances is the necessity of venting the regulators so as to prevent the escape of gas into the room in the event of leakage through the diaphragm. Various expedients have been devised to overcome this difficulty, such as a floating piston valve or a valve operated by an auxiliary diaphragm to close a vent to the atmosphere in case of rupture or leakage of the main diaphragm, but these expedients have not proved entirely satisfactory. In the regulator of my invention, the use of such expedients is unnecessary, because the auxiliary diaphragm 39 has a small diameter and is relatively stiff so that it does not appreciably compress the air in the chamber above it. During operation, the diaphragm 39 moves only about 1/100 of an inch so that the air displaced by it is negligible, and no vent need be provided to atmosphere. This eliminates the usual safety device or extra flue pipe.

I claim:

1. A thermostatic pressure regulator comprising a housing having inlet and outlet openings, a main valve controlling flow through the housing between the openings, pressure-responsive means in the housing for actuating the valve and forming one wall of a chamber in the housing, the housing having a constant bleed passage therein leading from the inlet side of the main valve to said chamber, a second pressure-responsive means in the housing forming one wall of a second chamber, a duct connecting said chambers for bleeding fluid from the first chamber into the second chamber, an auxiliary valve for regulating flow through the duct and controlled by the second pressure-responsive means, means connecting said second chamber to the outlet side of the main valve, and thermo-responsive means for valving the flow of fluid through said connecting means.

2. In a device for supplying gas to a main burner and a pilot for the burner, the combination of a housing having an inlet for connection to a source of gas supply and an outlet for connection to the burner, a main valve controlling flow between the inlet and outlet, pressure-responsive means in the housing for actuating the valve and forming one wall of a chamber in the housing, the housing having a constant bleed passage therein leading from the inlet side of the main valve to said chamber, a second pressure-responsive means in the housing forming one wall of a second chamber, a duct connecting said chambers for bleeding fluid from the first chamber into the second chamber, an auxiliary valve for regulating flow through the duct and controlled by the second pressure-responsive means, means for connecting the second chamber to the pilot and for connecting the pilot to the burner at the outlet side of the main valve, and thermo-responsive means subjected to heat from the pilot light for valving the flow through said connecting means.

3. In a pressure regulator, a primary valve having an inlet and an outlet, pressure-responsive means for operating the valve and partly defining a chamber, means for bleeding fluid from the high pressure side of the valve to the chamber, a duct between the chamber and the outlet side of the valve, a secondary valve in the duct responsive to pressure at the outlet side of the primary valve for controlling flow through said duct, and thermo-responsive valve means in said duct between the secondary valve and the outlet side of the primary valve for controlling flow through the duct.

4. In a pressure regulator, a primary valve having an inlet and an outlet, pressure-responsive means for operating the valve and partly defining a chamber, means for bleeding fluid from the high pressure side of the valve to the chamber, a duct between the chamber and the outlet side of the valve, a secondary valve in the duct responsive to pressure at the outlet side of the primary valve for controlling flow through said duct, a pilot burner connected to the outlet side of the primary valve, and valve means in said duct between the secondary valve and the outlet side of the primary valve and responsive to heat from the pilot burner for controlling flow through the duct.

BENSON F. WADDELL.